(12) United States Patent
Weiss et al.

(10) Patent No.: US 6,848,968 B2
(45) Date of Patent: Feb. 1, 2005

(54) COMMUNICATION SYSTEM FOR RADIO CONTROLLED TOY VEHICLE

(75) Inventors: Stephen Nicholas Weiss, Philadelphia, PA (US); Charles Stewart McCall, San Francisco, CA (US); Wallace White, Menlo Park, CA (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 10/046,374

(22) Filed: Jan. 14, 2002

(65) Prior Publication Data

US 2002/0106967 A1 Aug. 8, 2002

Related U.S. Application Data

(60) Provisional application No. 60/267,247, filed on Feb. 8, 2001.

(51) Int. Cl.[7] .......................... A63F 30/04; G08C 19/16
(52) U.S. Cl. ................................. 446/454; 340/825.69
(58) Field of Search ........................ 463/1, 36, 37, 463/39, 58, 63; 446/444, 454, 456; 273/441; 710/65; 37/389, 470–471, 438; 340/825.56, 825.69, 825.62; 180/167–169

(56) References Cited

U.S. PATENT DOCUMENTS

| | | |
|---|---|---|
| 3,768,367 A | 10/1973 | Fuzzell |
| 4,072,898 A | 2/1978 | Hellman et al. |
| 4,178,549 A | 12/1979 | Ledenbach et al. |
| 4,213,270 A | 7/1980 | Oda |
| 4,251,812 A | 2/1981 | Okada et al. |
| 4,275,394 A | 6/1981 | Mabuchi et al. |
| 4,295,082 A | 10/1981 | Moto et al. |
| 4,334,221 A | 6/1982 | Rosenhagen et al. |
| 4,584,504 A | 4/1986 | Lee et al. |
| 4,716,530 A | 12/1987 | Ogawa et al. |
| 4,912,471 A * | 3/1990 | Tyburski et al. ......... 340/10.34 |
| 4,938,483 A | 7/1990 | Yavetz |
| 4,964,837 A | 10/1990 | Collier |
| 4,980,681 A | 12/1990 | Noel |
| 5,065,078 A | 11/1991 | Nao et al. |
| 5,157,375 A | 10/1992 | Drori |
| 5,416,906 A | 5/1995 | Mariani |
| 5,488,631 A * | 1/1996 | Gold et al. .................. 375/145 |
| 5,638,053 A | 6/1997 | Schuman |
| 5,673,017 A | 9/1997 | Dery et al. |
| 5,764,697 A | 6/1998 | Sakuma et al. |
| 5,833,025 A | 11/1998 | Bhandari |
| 5,877,702 A | 3/1999 | Köhler |
| 5,885,159 A | 3/1999 | DeAngelis |
| 5,974,347 A | 10/1999 | Nelson |

(List continued on next page.)

OTHER PUBLICATIONS

Dr. J.A. Connelly, An Overview of the Phase–locked Loop (PLL) AN177, 1988, Philips, pp. 1–5.*
Horowitz et al. The Art of Electronics. NY., Cambridge University Press, 1989. p. 641–653.*

*Primary Examiner*—Michael O'Neill
(74) *Attorney, Agent, or Firm*—Akin Gump Strauss Hauer & Feld, LLP

(57) ABSTRACT

A communication scheme is employed for transmitting control signals from a remote control to a toy vehicle. The remote control includes control switches, an encoder and a transmitter and the toy vehicle includes a receiver, a decoder and actuators for controlling the operation of the toy vehicle in accordance with received control signals. The encoder generates a continuous stream of control signal packets with each of the packets including a predetermined number of biphase encoded bits. Each biphase encoded bit is of the same predetermined width with a 50% duty cycle, including two transmit elements. For one binary state, both of the transmit elements are the same and for the other binary state both of the transmit elements are opposite. Each packet includes a first predetermined number of flag bits, a second predetermined number of data bits and at least one checksum bit.

12 Claims, 9 Drawing Sheets

U.S. PATENT DOCUMENTS 5,999,576 A    12/1999   Lee
6,037,675 A    3/2000   Yoshida et al.
6,054,831 A    4/2000   Moore et al.
6,058,151 A    5/2000   Huang
6,109,568 A    8/2000   Gilbert et al.
6,151,318 A  * 11/2000   Woodward et al. ......... 370/392
6,390,883 B1    5/2002   Choi
6,656,012 B1  * 12/2003   DeAngelis et al. ......... 446/454
6,661,351 B1  * 12/2003   Matsushiro ............ 340/825.69

\* cited by examiner

COMMUNICATION SYSTEM FOR RADIO CONTROLLED TOY VEHICLE

CROSS-REFERENCE TO RELATED APPLICATIONS

This application claims the benefit of U.S. Provisional Patent Application No. 60/267,247 filed Feb. 8, 2001 and entitled, "Communication Scheme For Radio Controlled Vehicles" the entire subject of which is hereby incorporated herein by reference.

BACKGROUND OF THE INVENTION

The present invention relates generally to remotely controlled toy vehicles and, more particularly, to an improved communication system for controlling such toy vehicles.

Several types of communication systems are employed for remotely controlling the operation of toy vehicles. In one such communication system, control data packets are transmitted in a continuous stream by radio signals from a remote control device to the toy vehicle. Each data packet includes two types of bits, marker bits (W2) and data bits (W1). An example of a typical data packet employed in the prior art communication system is shown in FIG. 6. As illustrated in FIG. 6, the marker bits each have a 75% duty cycle and each marker bit is twice as long between rising edges as a data bit which has a 50% duty cycle. A single data packet includes four leading marker bits followed by a variable number of data bits with the number of data bits in a packet depending upon the control signal being transmitted. The data for controlling the operation of the toy vehicle is thus encoded in the number of data bits in a packet. For example, ten data bits in a packet may be an instruction for the vehicle to move forward, twenty-eight data bits in a packet may be an instruction for the vehicle to move forward and turn left, thirty-four data bits in a packet may be an instruction for the vehicle to move forward and turn right, and so. The width of each of the data bits is the same and the number of data bits used for each separate toy vehicle command signal is spaced at least six bits away from the number of data bits used for any other command signal to ease in decoding and to provide for packet level error checking. For example, a packet received with eleven data bits would be interpreted by the receiver/decoder in the toy vehicle to be an error.

While the data encoding schemes employed in such prior art communication systems are adequate for controlling toy vehicles with a limited number of controllable features, as the number of vehicle controllable features increases, the length of the packets required in such prior art encoding schemes becomes unacceptably long. For example, in using the above-described encoding scheme of the prior art in connection with a basic four-function vehicle controller, the longest transmitted command is 64 data bits long and when used with the four marker bits results in a total of 144 transmit elements (two transmit elements per bit). Since in the prior art encoding scheme each transmit element is about 315 microseconds in length, the longest packet for a four-function vehicle controller is approximately 45 milliseconds. Such a lengthy data packet is statistically more likely to be interrupted with intermittent radio noise then a shorter packet, particularly when the toy vehicle being controlled is at the distance limit of the communication range of the radio transmitter/receiver.

The prior art data encoding scheme in which a unique number of data bits is provided for each possible command is even less acceptable for controlling a toy vehicle in which a greater number of functions must be controlled. For example, newer toy vehicles include a seven position controller for steering functions, a seven position controller for drive functions and up to a three additional controlled functions (referred to as "twist"). The control of such a toy vehicle requires up to one-hundred forty-seven separate command codes (7×7×3) and, if implemented with the prior art encoding scheme having a separation of six data bits between commands, the longest command would be almost nine hundred data bits in length, taking more than 500 milliseconds to transmit. Such a lengthy command signal would unduly limit the responsiveness and range of such a toy vehicle to the point where the play value would be diminished.

In addition, the prior art encoding scheme does not have a "stop" command. Instead, the toy vehicle is programmed to stop in the absence of a command signal for a predetermined time period of about 50 milliseconds. Thus, when a user releases all of the control switches in order to stop the toy vehicle, no transmission is made by the controller and the toy vehicle continues in the then current direction of travel for at least an additional 50 milliseconds before actually stopping. The toy vehicle would also have to keep going for at least 50 milliseconds upon receipt of a noise signal because the receiver could not determine whether a stop command (no transmission) was desired.

The present invention provides a communication system having a data encoding scheme which overcomes many of the problems of the prior art encoding scheme, particularly, when used in connection with controlling a toy vehicle having a large number of controllable functions. With the present communication system, a data packet containing only 16 bits is employed for transmission of all control signals to the toy vehicle. In this manner, the time length of each data packet is minimized to improve responsiveness and reduce the likelihood of radio noise in the middle of the data transmission to increase range while still providing sufficient information to control multiple functions of the toy vehicle. Further, the encoding scheme employed in the present communication systems utilizes biphase encoded bits (50% duty cycle) to maximize reception distance with the bits being read at the middle of each transmit element thereby significantly decreasing the potential for decoding transient or erroneous data. In addition, with the present communication system, an affirmative, distinctive "stop" signal is transmitted by the remote control transmitted whenever the control switches are in the off position thereby providing enhanced and more rapid stopping of the toy vehicle and a higher immunity to reception errors then was possible with the prior art system. Finally, the present invention employs a digital phase-locked loop which looks for the middle of each transmit element to provide enhanced synchronization with a reduced likelihood of erroneous data being read. The present communication system provides shorter data packets, which results in short response times, a longer operational range and enhanced communication accuracy.

BRIEF SUMMARY OF THE INVENTION

Briefly stated, the present invention comprises a communication system for transmitting control signals from a remote control to a toy vehicle. The remote control includes control switches, an encoder and a transmitter. The toy vehicle includes a receiver, a decoder and actuators for controlling the operation of the toy vehicle in accordance with control signals received from the remote control. In the communication system, the encoder generates a continuous stream of control signal packets. Each of the packets includes a predetermined numbers of biphase encoded bits, with each biphase encoded bit being of the same predetermined width with a fifty percent duty cycle and including two transmit elements. One binary state is defined as being both of the transmit elements of a bit being the same and the other binary state is defined as both of the transmit elements of a bit being opposite. Each packet includes a first predetermined number of flag bits which are the same for all packets, a second predetermined number of data bits which vary depending upon the positions of the control switches and at least one checksum bit.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments, which are presently preferred. It should be understood, however, that the invention is not limited to the precise arrangements and instrumentalities shown.

In the drawings:

FIGS. 5A-1, 5A-2, 5B-1 and 5B-2 together are a functional flow diagram illustrating the functioning of the decoder.

DETAILED DESCRIPTION OF THE INVENTION

Figure 1:
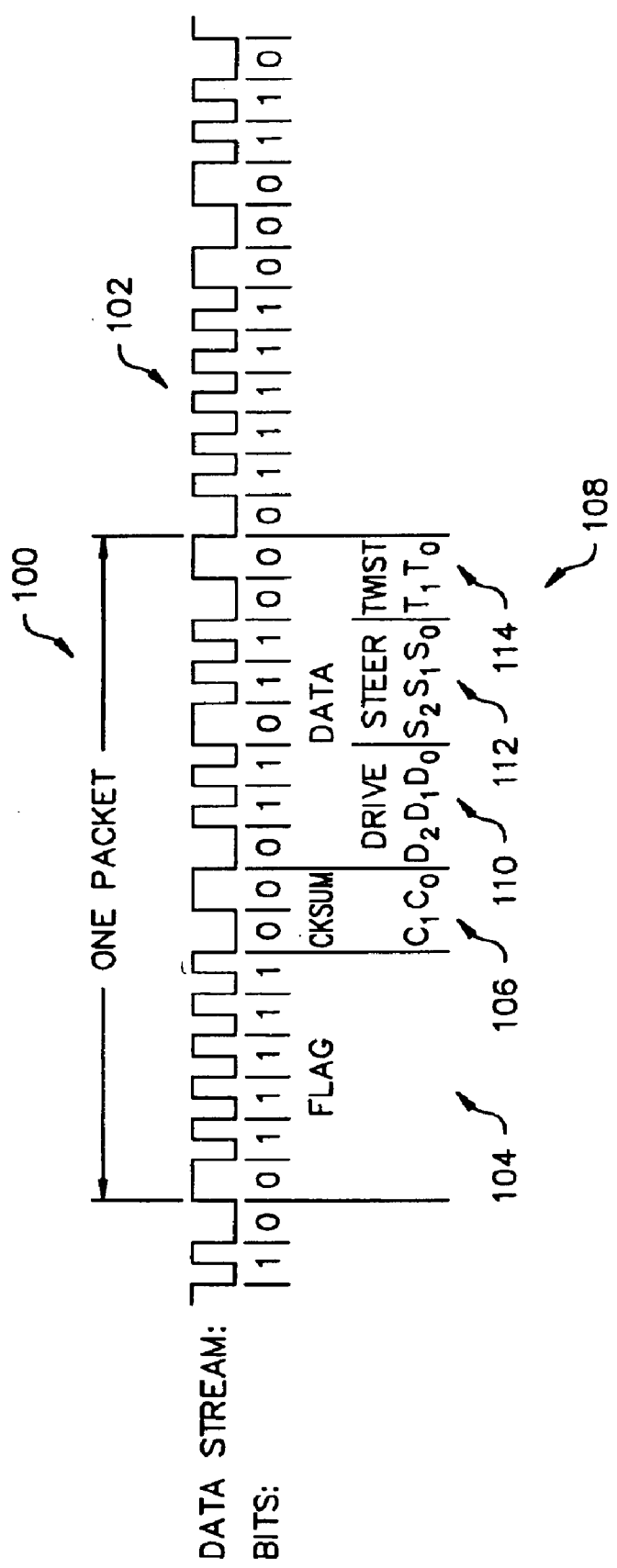
FIG. 1 is a diagramatic representation of a preferred control signal packet as employed in the present invention.

Referring to the drawings, wherein the same reference numerals are used to indicate the same elements throughout the several figures, there is shown in FIG. 1 a diagramatic representation of a control signal packet 100 as employed in connection with a preferred embodiment of the present invention. In the preferred embodiment, an encoder, preferably a microprocessor based encoder (not shown in FIG. 1) is employed for generating a continuous stream 102 of control signal packets 100 of the type illustrated in FIG. 1. Each packet 100 within the stream of packets 102 includes a predetermined number of bits, in the illustrated embodiment, 16 bits although a greater or lesser number of bits could be employed, if desired. In the present embodiment biphase encoded bits are used with each biphase encoded bit being of the same predetermined width and employing a 50% duty cycle including two transmit elements per encoded bit. Another form of encoding and/or a different duty cycle could be used. In the present embodiment, one binary state, binary "0", is defined as both of the transmit elements of a bit being the same and the other binary state, binary "1", is defined as both of the transmit elements of a bit being opposite. The use of such a biphase encoding scheme is beneficial in that it permits reading of the state of a bit by reading the center portion of each transmit element. Thus, if the center portion of both transmit elements of a bit are the same (either both "on" or both "off") the corresponding bit is decoded as a binary "0" and if the center portion of both of the transmit elements of a single bit are opposite (one being "on" and the other being "off"), the bit is decoded as a binary "1".

As shown in FIG. 1, in the present embodiment each signal packet 100 is comprised of 16 bits with the first or leading six bits being flag bits 104. Preferably, the flag bits 104 for each control signal packet 100 used to control a particular toy vehicle are always the same for example, "011111" so that a decoder of a receiver on the toy vehicle can easily identify the beginning or leading portion of each packet 100. If desired, some other number or configuration of flag bits 104 could be used.

The next two bits of each signal packet 100 are checksum bits 106 ($C_0$ and $C_1$) which in the present embodiment are determined by adding up all of the "1s" in the data portion 108 of the packet 100 and using the lowermost two bits of the sum as bits $C_0$ and $C_1$. A greater number or lesser number of checksum bits 106 could be used if desired or the checksum bits 106 could be eliminated. In addition some other manner of determining the checksum bits 106 could used.

The next eight bits in the signal packet 100 comprise the data bits 108 which determine the actual operation of the toy vehicle. The first three data bits 110 ($D_0$, $D_1$ and $D_2$) are for the various drive commands for the toy vehicle, the next three data bits 112 ($S_0$, $S_1$ and $S_2$) are for the toy vehicle steering commands and the last two data bits 114 ($T_0$, and $T_1$) are the "twist" bits which may be assigned, for example, to stunt buttons on the remote control. By separating the data bits 108 into three binary coded decimal fields 110, 112, 114, it is possible to transmit control signals which each contain up to seven different drive commands, up to seven different steering commands and up to three different twist commands in each 16 bit signal packet 100. With each transmit element being about 315 microseconds long, the total length of each signal packet 100 is approximately 10 milliseconds, substantially shorter than even the shortest command signal employed with the above-described prior art communication scheme. Such a significantly shorter signal packet 100 is more likely to be received by a toy vehicle without intervening radio noise to the thereby provide a control range of greater distance. Such shorter length packets 100 also improve responsiveness for maximizing reception distance even while utilizing the same transmit and receive hardware.

An additional feature of the present embodiment is the use of, a "stop" signal packet 100 which is automatically encoded and transmitted whenever the control switches of the remote control unit (not shown in FIG. 1) are released indicating that the user wishes to stop the toy vehicle. A presently preferred "stop" command is illustrated by the signal packet of FIG. 1. By using a distinct stop command signal packet 100 anytime that no control switches are actuated or depressed, the receiver on the toy vehicle can instantly respond without providing any substantial grace period of the type employed in the prior art communication scheme during which the toy vehicle would continue to function in accordance with a previously received command signal until the receiver realized that no further command was forthcoming (i.e., a stop situation). In the present embodiment, the stop command is one in which both the drive data bits 110 and the steering data bits 112 equal "three" signifying the center position for the steering switches and the stop position for the speed control switches and the twist bits 114 equal "zero", indicating neither twist button is depressed. Of course, with four of the data bits being "1s", the checksum bits are both zero as shown.

Figure 2:
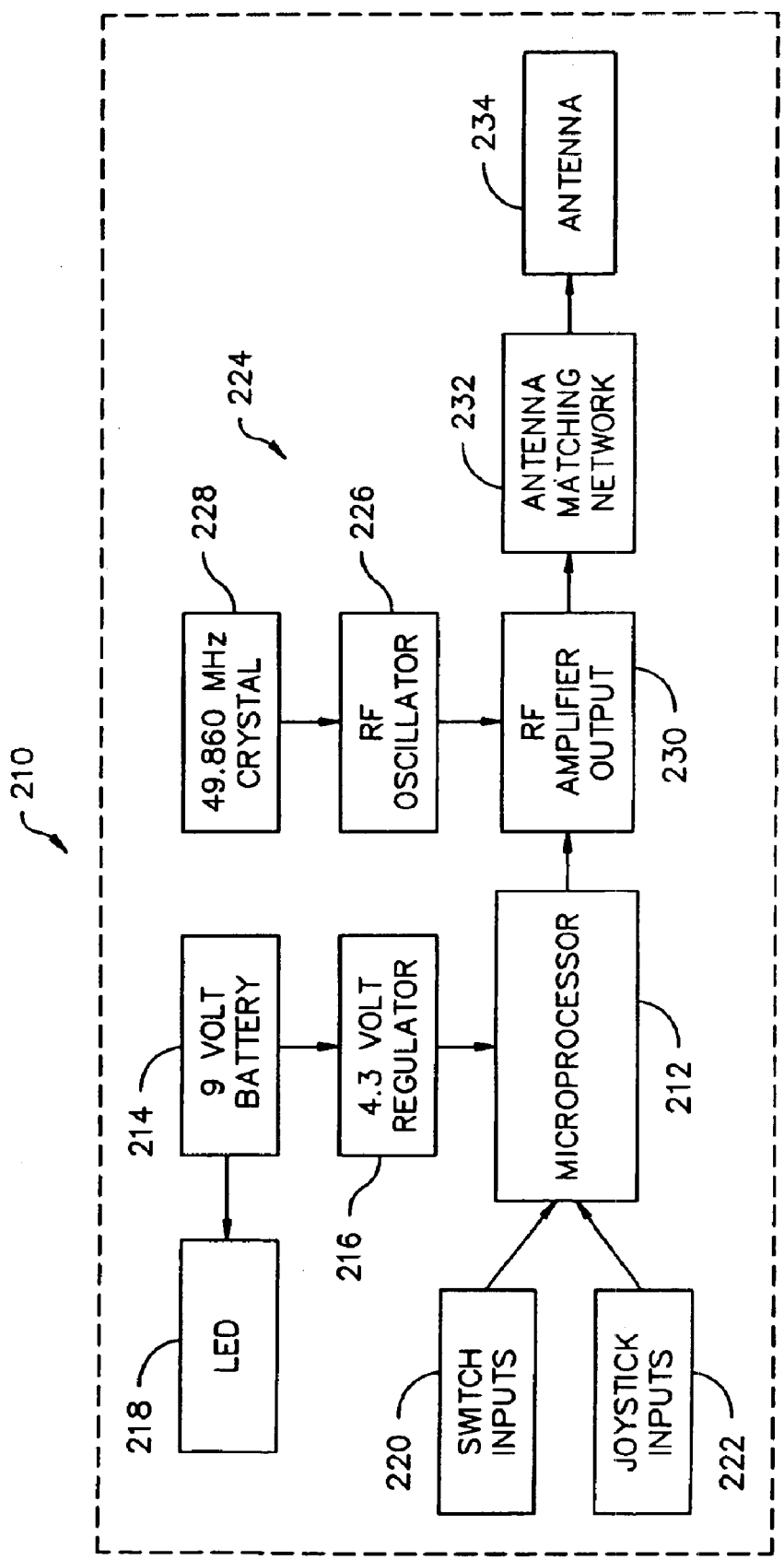
FIG. 2 is a functional schematic block diagram of the principal functional components of a preferred remote control unit.

FIG. 2 is schematic block diagram of the principle components of a preferred remote control unit 210. The remote control unit 210 shown in FIG. 2 is typical of remote control units known to those of ordinary skill in the art for controlling the operation of a radio controlled toy vehicle. Accordingly, while FIG. 2 illustrates a presently preferred remote control unit 210, it should be understood by those of ordinary skill in the art that the above-described communication system or scheme could be employed with any other suitable remote control unit.

The remote control unit 210 includes an encoder portion having a microprocessor 212 which functions to control the operation of the other components of the remote control unit 210 and to generate the control signal packets 100 as described above. The microprocessor 212 is preferably of a type well known to those of ordinary skill in the art. Details of the structure and functional aspects of the microprocessor 212 are known to those of ordinary skill in the art and need not be described in detail herein. Preferably, the remote control unit 210 is powered by a battery, preferably a 9 volt battery 214 which may be of the rechargeable or non-rechargeable type. Power from the battery 214 is applied to the microprocessor 212 through a voltage regulator, in the present embodiment a 4.3 volt regulator 216. The use of the voltage regulator 216 with a regulated output voltage substantially below the peak voltage of the battery 214 permits operation of the remote control unit 210 even with a diminished voltage output from the battery 214. Preferably, the voltage regulator 216 is of a type well known to those of ordinary skill in the art and is commercially available. Power for the other below-described components of the remote control unit 210 is also supplied by the battery 214. A light emitting diode (LED) 218 is connected to the battery 214 to provide to the user an indication of the remaining battery power.

Figure 4:
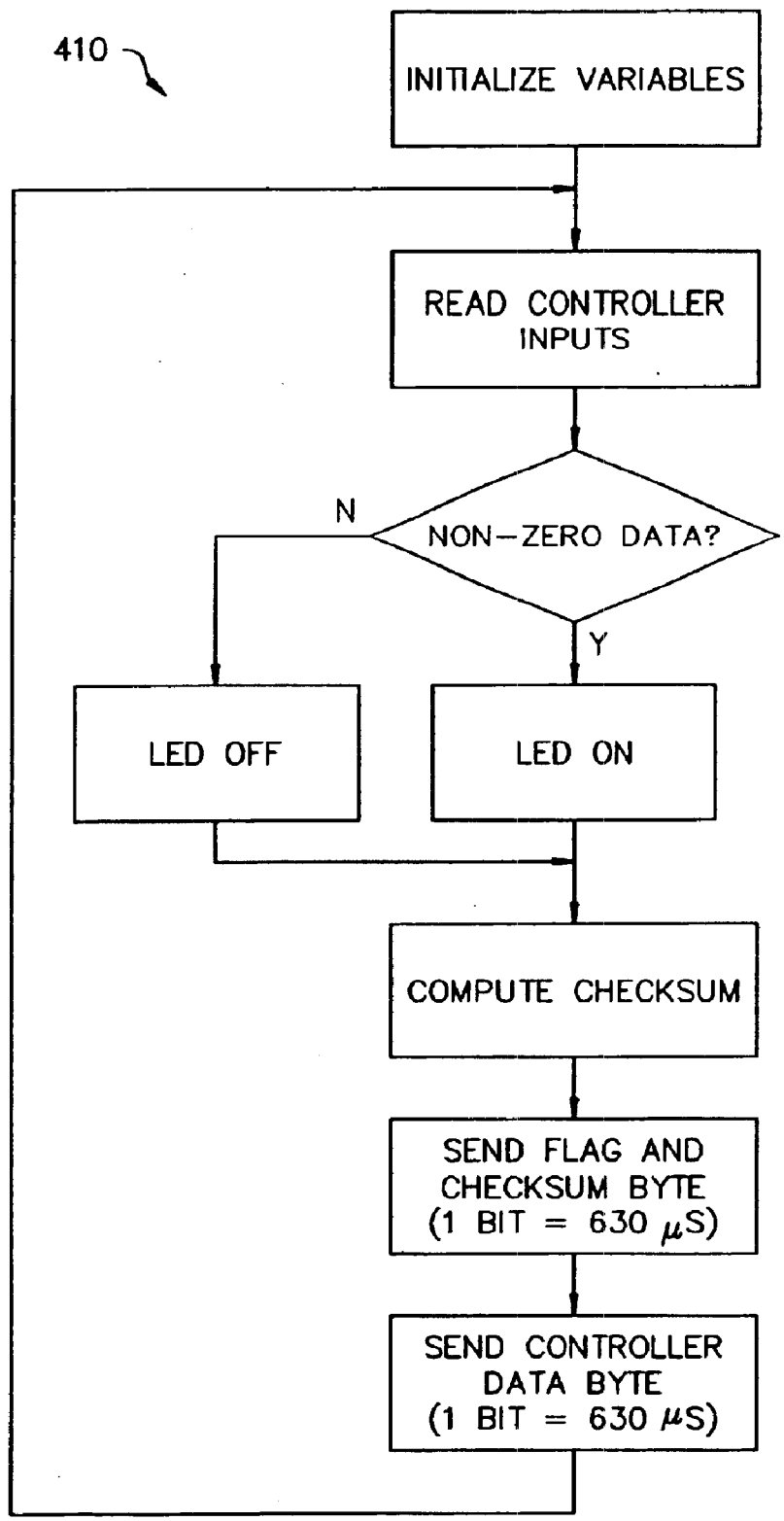
FIG. 4 is a functional flow diagram illustrating the functioning of the encoder portion of the remote control unit.
Figures 1, 5A:
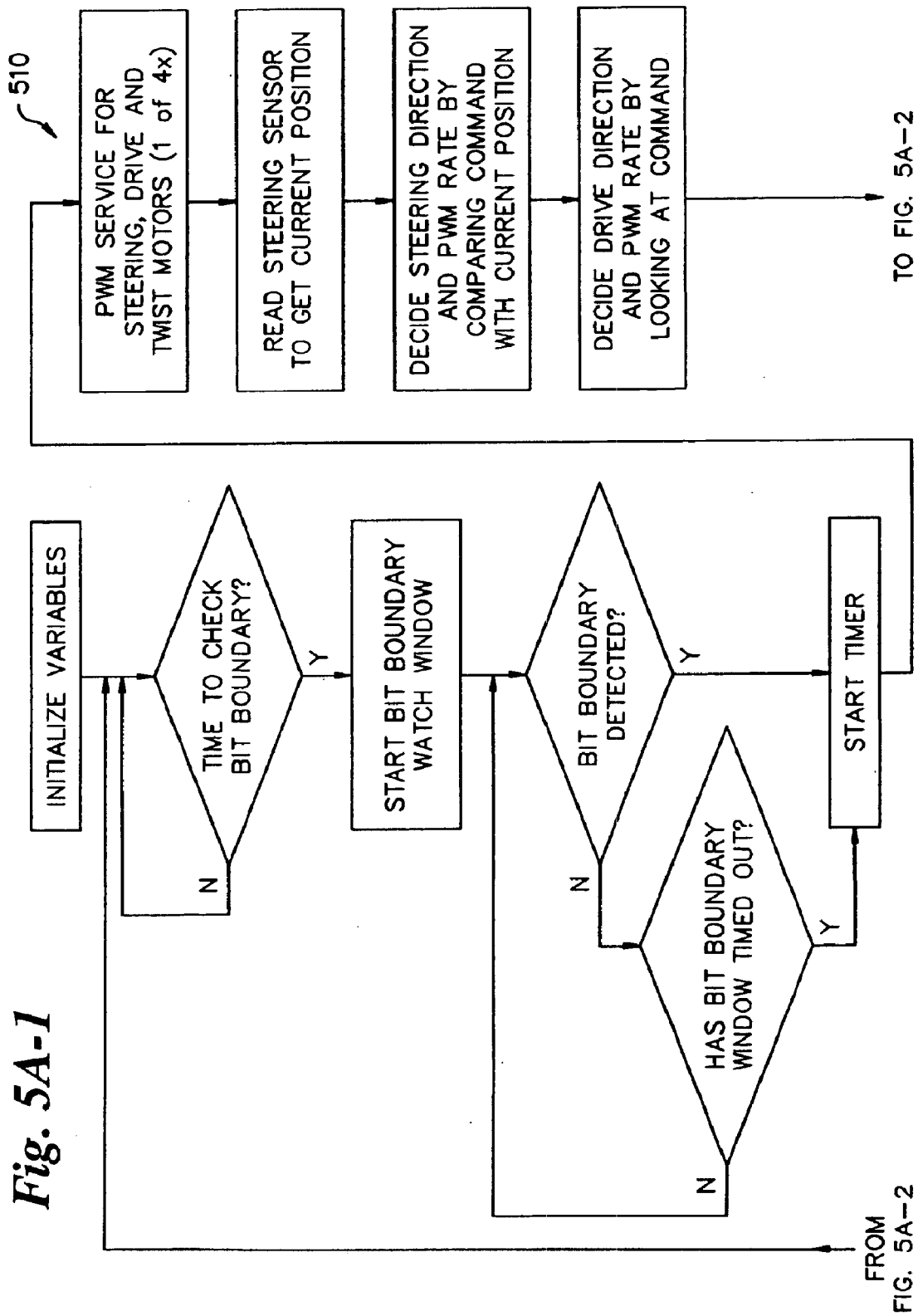
Figures 2, 5A:
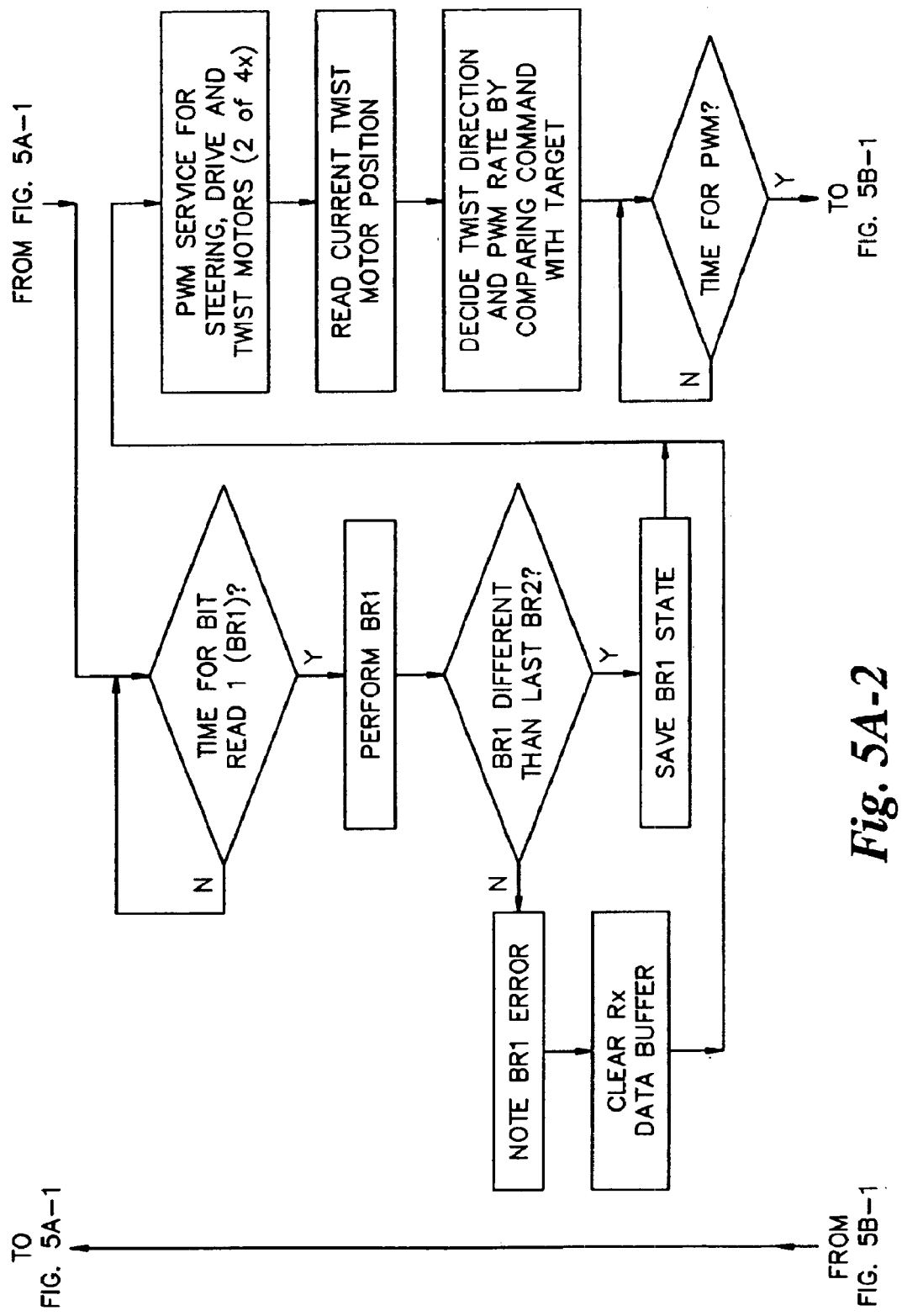
Figures 1, 5B:
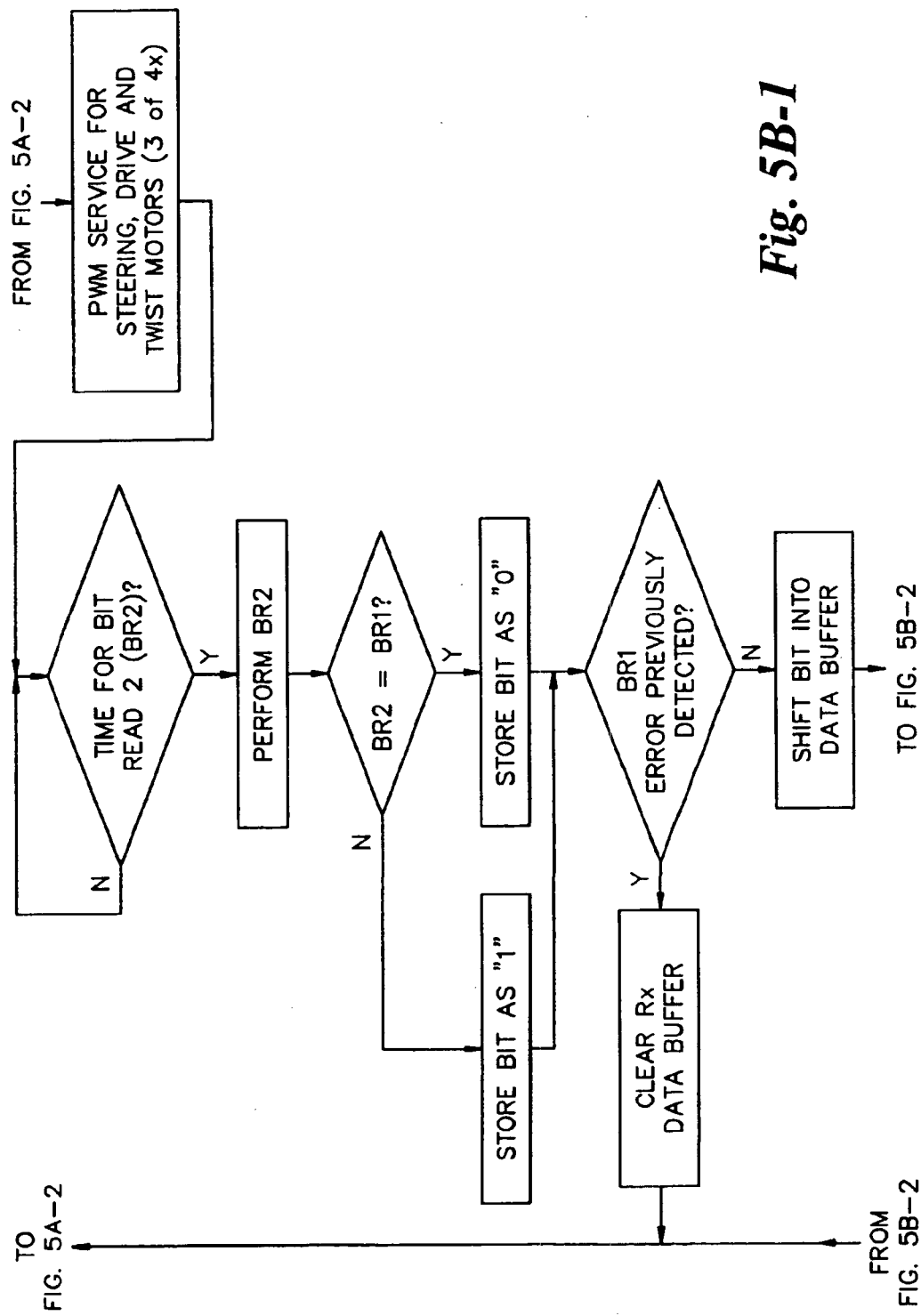
Figures 2, 5B:
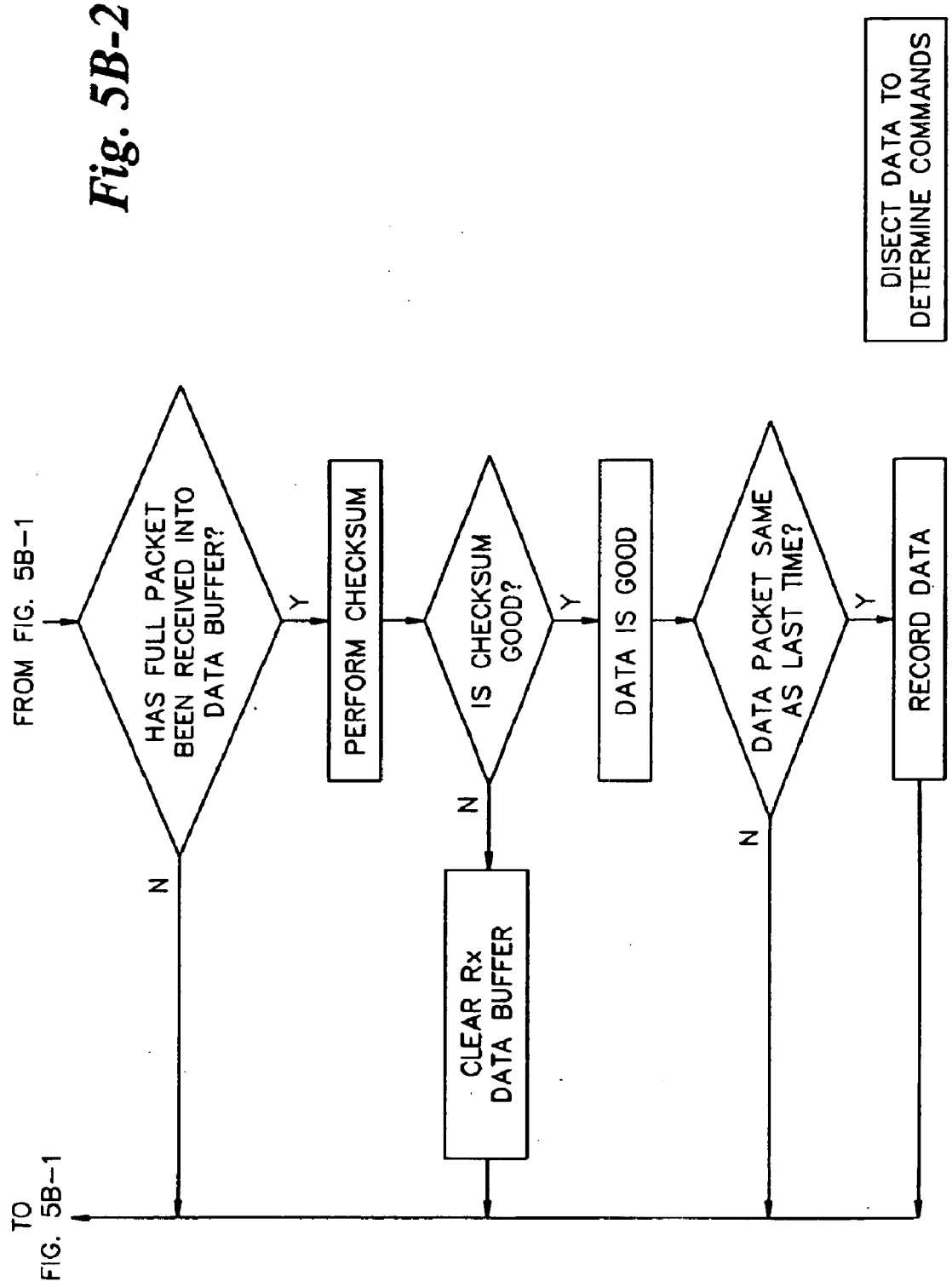
Figure 6:
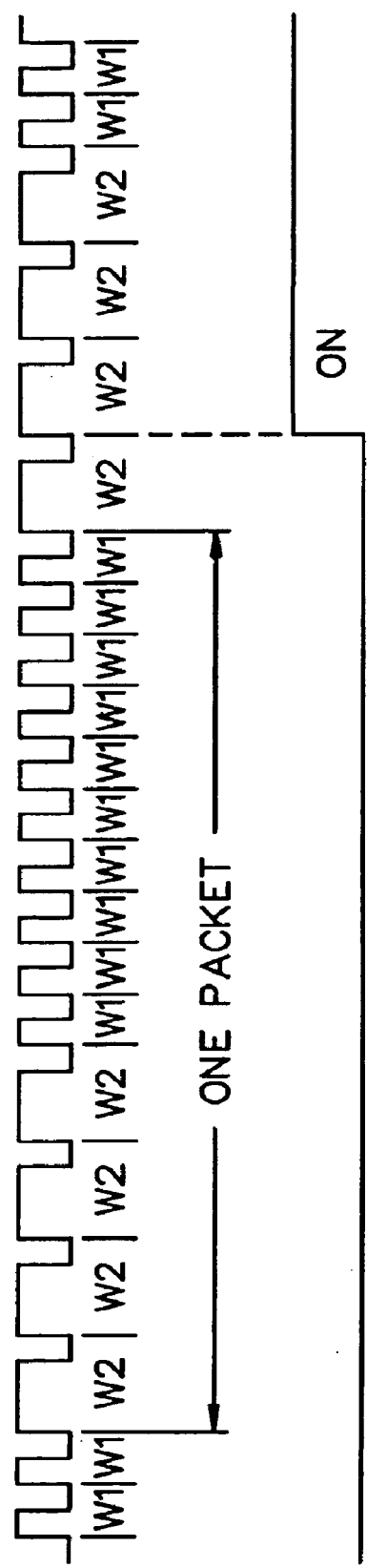
FIG. 6 is a diagramatic representation of a prior art control signal packet.

The remote control unit 210 includes a plurality of control switches (not shown) which are activateable by a user for controlling the operation of a toy vehicle. Typically, one control switch (which may be a lever switch) is employed for determining the speed of the vehicle in either a forward or a reverse direction (drive control switch), a second control switch (which may also be a lever switch) is employed for controlling the steering of the toy vehicle (left, right or straight) and one or more additional control switches (which may be push button switches) are employed for "twist" features of the vehicle, such as noise generation, flashing lights, causing the vehicle to roll over, etc. The user controlled switches may be in the form of lever switches, push button switches, a joy stick, or the like. Regardless of the type of control switches employed, the position of each of the switches generates signals which are employed as inputs 220, 222 to the microprocessor 212. The microprocessor 212 receives the input signals from the control switches and "encodes" the signals by generating corresponding data bits 108 which are incorporated into each of the signal packets 100. The microprocessor 212 substantially simultaneously calculates the checksum bits 106 which are also incorporated into each signal packet 100. Finally, the microprocessor generates the flag bits 104 which, as discussed above, are always the same for a particular toy vehicle. The microprocessor 212 strings together the flag bits 104, checksum bits 106 and data bits 108 in the manner described above and shown in FIG. 1 to create a 16 bit control signal packet 100 for transmission to the toy vehicle. The basic steps followed by the microprocessor 212 in generating each control signal packet 100 are illustrated by the flow diagram 410 of FIG. 4. As long as the control switches remain in the same positions, the microprocessor 212 continuously generates the same control signal packet 100 as a continuous stream of packets 102. If the position of any of the control switches changes, the microprocessor 212 senses the change and generates a series of new control signal packets 100 which are continuously generated until a further change in the position of a switch is sensed.

The remote control unit 210 also includes a transmitter portion 224. The transmitter portion 224 includes a radio frequency oscillator 226 which, preferably is a crystal controlled oscillator and includes a crystal 228. In the presently preferred embodiment, the crystal 228 is a 49.860 MHz crystal. However, it will be appreciated by those of ordinary skill in the art that some other crystal, at some other frequency may alternatively be employed. It will also be appreciated by those of ordinary skill in the art that the oscillator 226 need not necessarily, be a crystal controlled oscillator.

The output signal from the oscillator 226 is amplified by a radio frequency output amplifier 230. The radio frequency output amplifier 230 also receives the control signal packets 100 from the microprocessor 212 and uses the control signal packets 100 to modulate the radio frequency carrier signal received from the oscillator 226. The output signal from the radio frequency output amplifier 230 passes through an antenna matching network 232 to an appropriate antenna 234 for radiating the signal. The radio frequency output amplifier 230, antenna matching network 232 and the antenna 234 are each of a type well known to those of ordinary skill in the radio controlled toy vehicle art. It should be appreciated by those of ordinary skill in the art that, if desired, some other method of transmitting the control signal packets 100 generated by the microprocessor 212 may alternatively be employed. Likewise, the remote control unit 210 may employ some structure other than the microprocessor 212 for encoding the signals from the user input switches 220, 222 into the control signal packets 100.

Figure 3:
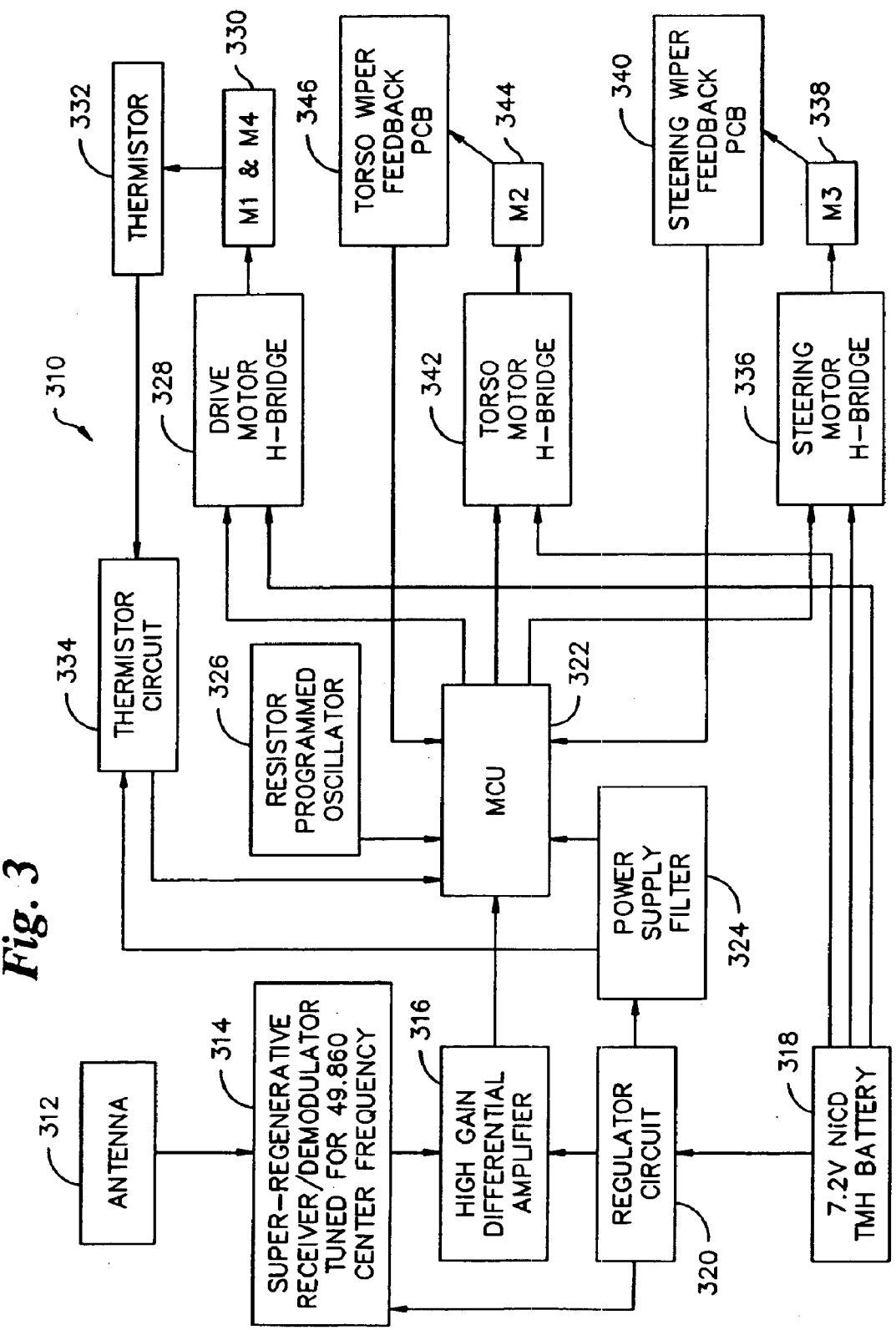
FIG. 3 is a functional schematic block diagram of the principal functional components of a preferred receiver/decoder of the toy vehicle.

FIG. 3 is a functional schematic block diagram of a preferred embodiment of a receiver/decoder 310 employed within a toy vehicle controlled by the remote control unit 210 shown in FIG. 2. The receiver/decoder 310 includes a receiver section for receiving and demodulating signals received from the remote control unit 210. The receiver section comprising an antenna 312, a receiver/demodulator 314 and a high gain differential amplifier 316. The antenna 312 is of a type well know to those of ordinary skill in the toy vehicle art. The receiver/demodulator 314 is preferably of the super-regenerative type and is tuned for the frequency of the transmitter portion 224 of the remote control unit 210. In the present embodiment, 49.860 MHz is the transmit and receive frequency. However, it will be appreciated by those of ordinary skill in the art that any other suitable frequency may alternatively be employed. Details of the structure and operation of the receiver/demodulator 314 are generally known to those of ordinary skill in the art and need not be presented herein for a complete understanding of the present invention. It should also be understood that any other suitable type of receiver could alternatively be employed. The demodulated output from the receiver/demodulator 314 is provided to the high gain differential amplifier 316 which amplifies the signal in a manner well known to those of ordinary skill in the art.

As shown in FIG. 3, power for the receiver/decoder 310 is provided by a battery 318, in the present embodiment a 7.2 volt NICad TMH battery. It will be appreciated by those of ordinary skill in the art that some other type of battery having the same or a different voltage could alternatively be employed. The receiver/demodulator 314 and the high gain differential amplifier 316 are powered by the battery 318 through a regulator circuit 320 which functions in a manner well known to those of ordinary skill in the art to provide a regulated output voltage. Details of the structure and operation of the regulator circuit 320 are not critical to the present invention and, therefore, are not presented herein. Suffice it to say that the regulator circuit 320 functions to provide a regulated DC output voltage at a predetermined level regardless of the voltage level of the battery 318.

The heart of the receiver/decoder 310 is a microprocessor (MCU) 322. The microprocessor 322 is also powered by the regulator circuit 320 through a power supply filter 324. The microprocessor 322 receives the demodulated and amplified digital signals from the high gain differential amplifier 316 and, based upon an installed software program, reads and decodes the received signals and, using the decoded data generates control signals to control the operation of the motors within the toy vehicle in accordance with the decoded control signals. A resistor programmed oscillator 326 provides clock signals to the processor 322. Output control signals from the processor 322 are provided to a first actuator comprising a high power drive motor H bridge 328 for controlling the operation of the two drive motors (M1 and M4) 330. A thermistor 332 is employed for sensing the temperature of the drive motors 330 to provide feedback through a thermistor circuit 334 to the microprocessor 322. In this manner, the microprocessor 322 functions to prohibit overheating of either of the drive motors 330. Another output control signal from the microprocessor 322 is applied to a second actuator comprising a medium power steering motor H-bridge 336 to control operation of the steering motor (M3) 338. The steering motor 338 includes a steering wiper feedback/PCB 340 which provides an encoded feedback signal to the microprocessor 322 so that the microprocessor 322 is continuously aware of the position of the steering motor 338. A third output control signal from the microprocessor 322 is applied to a third actuator comprising a medium power torso motor H-bridge 342 to control the operation of a "twist" motor (M2) 344. A torso wiper feedback/PCB 346 associated with the twist motor 344 provides encoded feedback signals to the microprocessor 322 with respect to the location of the twist motor 344.

It will be appreciated by those of ordinary skill in the art that while the present embodiment employs a microprocessor 322 for decoding the received control signals and generating signals for controlling the various motors 330, 338, 344 within the toy vehicle, any other suitable control scheme known to those of ordinary skill in the art may alternatively be employed.

FIGS. 5A-1, 5A-2, 5B-1 and 5B-2 together constitute a flow diagram 510 illustrating the operation of the software program or firmware employed by the microprocessor 322 for controlling the operation of the various toy vehicle motors 330, 338, 344. It should be appreciated by those of ordinary skill in the art that the microprocessor 322 could function in a different manner than the manner shown by the flow diagram 510. Accordingly, the flow diagram 510 should be considered only as but one example of a way in which the control program may function.

As mentioned above, in the presently preferred embodiment, decoding of the received control signal packet 100 by the microprocessor 322 is done not by looking at the edges of the bits, but by looking at the middle of each biphase bit transmit element. In this manner, it doesn't matter if the signal line has an extra noise blip on it, as long as the signal is what it should be at the middle of the transmit element. If a noise blip is present at the middle of a transmit element, the microprocessor 322 must have the ability to determine whether the data packet is corrupted. For this purpose, a digital phase-locked loop (DPLL) is provided within the firmware stored within a memory portion of the microprocessor 322. The DPLL looks for an edge in the middle of every bit for synchronization purposes. If the edge appears exactly where the DPLL expects it to be, the DPLL maintains its current synchronization clock with no shift in phase. If the edge doesn't come until a few clock ticks after the DPLL expects it, the DPLL delays its clock a tick or two to slightly reduce the phase difference. It does not shift its phase to attempt to exactly match the receive signal, because this would make the DPLL clock to jumpy. Instead, the DPLL just moves part way toward the incoming signal. In this manner, a new data stream will require some time before the DPLL syncs to it, but the DPLL has a better chance of remaining synced once the data stream is flowing. The DPLL thus provides an attractive, simple way of getting and staying synchronized to the data stream while not being held hostage by a late edge to a bit or a noise bit. In addition, by transferring the signal packets 100 in a continuous stream 102 with no delay between packets, the phase of the data stream 102 does not change and the DPLL is effective for synchronization.

In the presently preferred embodiment, the microprocessor 322 does not function on an interrupt basis. Instead, the microprocessor functions on a periodic basis with a portion of each cycle being dedicated to the performance of certain functions, including running the DPLL routine, reading the received data bits, generating the control output signals, etc. However, it will be appreciated by those of ordinary skill in the art that the microprocessor 322 could function on an interrupt basis, if desired. It will also be appreciate by those of ordinary skill in the art that some other form of synchronization, other than the above-described DPLL could alternatively be employed.

From the foregoing, it can be seen that the present invention comprises an improved communication scheme for controlling the operation of a remotely controlled toy vehicle. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An improved communication system for controlling a remotely controlled toy vehicle by transmitting control signal from a remote control to a toy vehicle, wherein the remote control including control switches, an encoder and a transmitter, the toy vehicle including a receiver, a decoder and actuators for controlling the operation of the toy vehicle in accordance with control signals received from the remote control, wherein the improvement comprises:

the encoder generating a continuous, uninterrupted stream of control signal packets which are continuously transmitted at a constant frequency, with each control signal packet, other than the first packet, immediately following the preceding packet in time, each of the packets including a predetermined number of biphase encoded bits, each biphase bit being of the same predetermined width with a fifty percent duty cycle including two transmit elements with one binary state being defined as both of the transmit elements of a bit being opposite, each packet including a first predetermined number of flag bits, the states of which are the same for all packets, a second predetermined number of data bits, the states of which vary depending upon the positions of the control switches, and at least one checksum bit.

2. The communication system as recited in claim 1 wherein a binary "zero" is defined as both transmit elements of a bit being the same and a binary "one" is defined as both transmit elements of a bit being opposite.

3. The communication system as recited in claim 1 wherein each packet includes sixteen bits.

4. The communication system as recited in claim 3 wherein the first predetermined number of flag bits is six.

5. The communication system as recited in claim 4 wherein the second predetermined number of data bits is eight.

6. The communication system as recited in claim 5 wherein three of the data bits are for controlling the drive functions of the toy vehicle and three of the data bits are for controlling the steering functions of the toy vehicle.

7. The communication system as recited in claim 6 wherein two of the data bits are for controlling additional toy vehicle functions.

8. The communication system as recited in claim 1 wherein the packet include two checksum bits determined by adding together ill of the ones in the data bits and using the lower two bits of the sum.

9. The communication system as recited in claim 1 wherein the flag bits are at the leading edge of each packet and are followed by the checksum bit(s) and the data bits.

10. The communication system as recited in claim 1 wherein the decoder reads the received control signals at the middle of each transmit element of each bit within the packet.

11. The communication system as recited in claim 10 wherein the decoder comprises a microprocessor.

12. The communication system as recited in claim 1 wherein the receiver includes a digital phase-locked loop for synchronization of the decoder with the received stream of packets.

* * * * *